United States Patent [19]

Gautraud et al.

[11] Patent Number: 4,893,182

[45] Date of Patent: Jan. 9, 1990

[54] VIDEO TRACKING AND DISPLAY SYSTEM

[75] Inventors: Michael G. Gautraud, Muskegon, Mich.; Thomas M. Buie, Richardson; Mark F. Blessing, Dallas, both of Tex.

[73] Assignees: Micronyx, Inc., Richardson, Tex.; Brunsick Bowling & Billiards Corporation, Muskegon, Mich.

[21] Appl. No.: 170,268

[22] Filed: Mar. 18, 1988

[51] Int. Cl.4 .............................................. H04N 7/18
[52] U.S. Cl. ....................................... 358/105; 358/93; 273/63 D; 434/369
[58] Field of Search .................... 358/105, 107, 93, 22, 358/125; 352/121; 434/249, 369; 273/639, DIG. 28

[56] References Cited

U.S. PATENT DOCUMENTS

| | | | |
|---|---|---|---|
| 3,016,812 | 1/1962 | Chatlain | 358/108 |
| 3,715,480 | 2/1973 | Levine | 178/6 |
| 4,025,718 | 5/1977 | Paretti | 358/105 |
| 4,090,221 | 5/1978 | Connor | 358/105 |
| 4,158,853 | 6/1979 | Sullivan et al. | 358/93 |
| 4,163,941 | 8/1979 | Linn, Jr. | 358/107 |
| 4,168,510 | 9/1979 | Kaiser | 358/183 |
| 4,179,704 | 12/1979 | Moore et al. | 358/22 |
| 4,214,263 | 7/1980 | Kaiser | 358/22 |
| 4,218,703 | 8/1980 | Netravali et al. | 358/136 |
| 4,220,967 | 9/1980 | Ichida et al. | 358/105 |
| 4,270,143 | 5/1981 | Morris | 358/125 |
| 4,545,576 | 10/1985 | Harris | 273/25 |
| 4,626,891 | 12/1986 | Achiha | 358/21 R |
| 4,630,114 | 12/1986 | Bergmann et al. | 358/136 |
| 4,661,846 | 4/1987 | Kondo | 358/165 |
| 4,688,090 | 8/1987 | Veitch | 358/108 |
| 4,713,686 | 12/1987 | Ozaki et al. | 358/105 |
| 4,713,693 | 12/1987 | Southworth et al. | 358/105 |

Primary Examiner—John K. Peng
Attorney, Agent, or Firm—Richards, Harris, Medlock & Andrews

[57] ABSTRACT

An imaging processing system (10) for displaying a succession of selected separated images of a moving object (62, 64) moving in an otherwise substantially static scene includes an image sensor (12) for generating video signals of the static scene and for generating video signals of the static scene including the object (62, 64) moving therethrough. The video signals are generated over a plurality of frames (80-94). A first memory (104) stores the video signals of at least one of the plurality of frames from the static scene. A second memory (104) stores the video signals of the plurality of frames from the static scene including the object (62, 64) moving therethrough. Structure (106) is provided for comparing on a frame-by-frame basis the video signals stored in the first memory (104) with the video signals stored in the second memory (104) to thereby determine the presence of the object (62, 64) in each of the plurality of frames (80-90). A display (18) illustrates the location of the object (62, 64) in each of the plurality of frames (80-).

26 Claims, 5 Drawing Sheets

VIDEO TRACKING AND DISPLAY SYSTEM

TECHNICAL FIELD

This invention relates to image processing systems, and more particularly to a system for capturing and displaying the trajectory of a moving object.

BACKGROUND ART

In many instances, in order to more clearly illustrate the trajectory of a moving object, it is desirable to record the path of the object by photographic devices. In the past, multiple-flash stroboscopic photography has been used to show in a single picture the complete motion path of an object. This technique has been found to be a useful and an instructive way of visualizing minor changes associated with, for example, athletic activities such as the swing of a baseball bat or a golf club. The apparatus for producing such photographs include a stroboscopic light source for intermittently illuminating the object in motion and a black scene background.

With the advances in television systems and video cameras, displays have been produced for providing a television display which depicts the motion of an object in a scene during predetermined time intervals. The path of a moving object can then be viewed for subsequent study. The images can also be stored for comparison purposes with later images, such as, for example, comparing athletic activities over a period of time. With the increasing use of video cameras, the recording of a path of a moving object has been made easier, and with viewing techniques of playback units, slow motion and stop action features allow viewers to clearly review the path of moving objects and study their trajectories.

The use of television systems as well as video cameras, for the capturing of the trajectories of moving objects requires excessive storage facilities, and therefore existing systems for capturing and displaying the path of a moving object have been limited in their use. For example, if it is desired to capture the path of a bowling ball as it travels down a lane, and in particular, if it is desired to capture the path of the bowling ball throughout multiple games being played at a bowling facility simultaneously, the amount of storage memory would be prohibitive both in volume and expense.

A need has thus arisen for an image processing system for capturing and displaying the trajectory of moving objects which requires minimal data storage capability for the selective capturing of large amounts of data.

DISCLOSURE OF THE INVENTION

In accordance with one aspect of the present invention, an imaging processing system for displaying a succession of selected separated images of a moving object moving in an otherwise substantially static scene is provided. The system includes an image sensor for generating video signals of the static scene and for generating video signals of the static scene including the object moving therethrough. The video signals are generated over a plurality of frames. A first memory stores the video signals of at least one of the plurality of frames from the static scene. A second memory stores the video signals of the plurality of frames from the static scene including the object moving therethrough. Structure is provided for comparing on a frame-by-frame basis the video signals stored in the first memory with the video signals stored in the second memory to thereby determine the presence of the object in each of the plurality of frames. A display is provided for illustrating the location of the object in each of the plurality of frames.

In accordance with another aspect of the present invention, a bowling ball tracking and display device for displaying an image of a bowling ball at predetermined positions along a bowling lane is provided. An image sensor generates video signals of the bowling lane and generates video signals of the bowling lane including the bowling ball moving therethrough. The video signals are generated over a plurality of frames. A first memory stores video signals of at least one of the plurality of frames from the bowling lane. A second memory stores video signals of the plurality of frames from the bowling lane including the bowling ball moving therethrough. Structure is provided for comparing on a frame-by-frame basis the video signals stored in the first memory with the video signals stored in the second memory to thereby determine the presence of the bowling ball in each of the plurality of frames. A display is provided for illustrating the location of the bowling ball in each of the plurality of frames. The display illustrates a simulated image of the bowling lane and includes the bowling ball positioned thereon corresponding to the location of the bowling ball within each of the plurality of frames.

DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION

Figure 1:
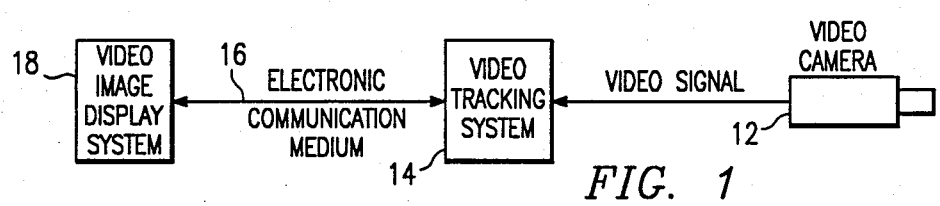
FIG. 1 is a block diagram of the present video tracking and display system.

Referring to FIG. 1, a block diagram of the present video tracking and display system is illustrated, and is generally identified by the numeral 10. Video tracking and display system 10 includes a video camera 12 for capturing the image of a generally static scene through which the moving object passes, both in the absence of the object and in the presence of the object. Video camera 12 generates a video signal which is applied to a video tracking system 14. Video tracking system 14 will be subsequently described in connection with FIG. 7.

The output of video tracking system 14 is applied via an electronic communication medium 16 such as, for example, a local area network to a video image display system 18. Video image display system 18 displays the trajectory or path of the moving object by depicting the object at predetermined and selected positions along its path. In this manner, the path of the object can be stored and displayed to allow the user of the present video tracking and display system 10 to view the path of the moving object. The path of the moving object can be displayed, for example, on a background of a stored image. While the present video tracking and display system 10 will subsequently be described for the purposes of tracking a bowling ball down a bowling lane, the present invention can be utilized for the tracking of any moving object moving through a substantially static scene and, can be used for the tracking and display of automobiles moving down a roadway, aircraft in flight, and for other sporting activities such as basketball, baseball, golf and rifle activities.

Figure 3:
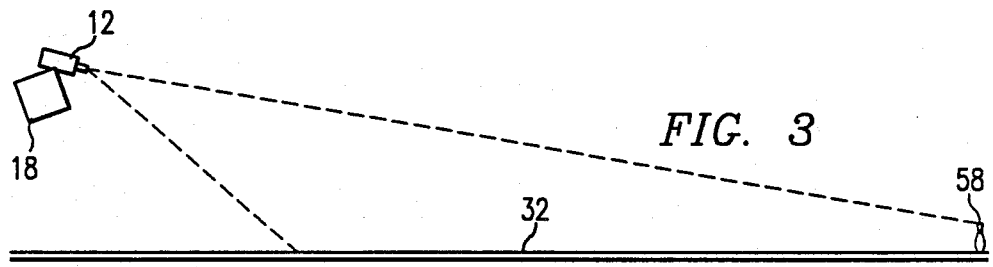
FIG. 3 is a side elevational view of the bowling lanes illustrated in FIG. 2.
Figure 2:
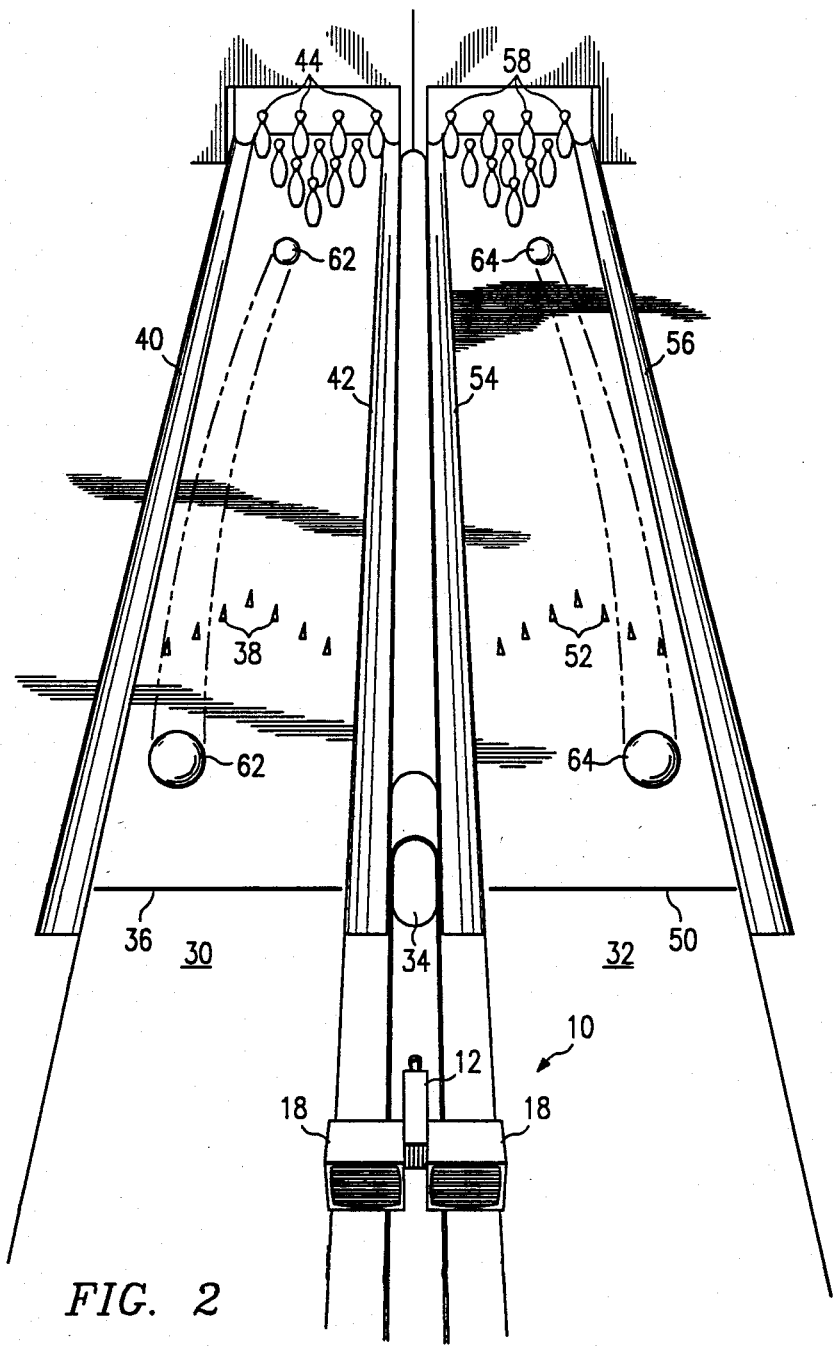
FIG. 2 is a perspective view of the present video tracking and display system utilized for tracking the trajectory of a bowling ball along a bowling lane.

Referring simultaneously to FIGS. 2 and 3, the present video tracking and display system 10 is illustrated for the use of tracking a bowling ball as it travels down a bowling lane. FIG. 2 illustrates the present video tracking and display system 10 mounted above a pair of bowling lanes 30 and 32. Bowling lanes 30 and 32 are standard bowling lanes typically found at a bowling center and include a ball return device 34 disposed therebetween. Associated with bowling lane 30 is a foul line 36, reference arrows 38, gutters 40 and 42 and bowling pins 44. Similarly, bowling lane 32 includes a foul line 50, reference arrows 52, gutters 54 and 56 and bowling pins 58. Video camera 12 is positioned between bowling lanes 30 and 32 in order to capture bowling balls traveling down both bowling lanes 30 and 32. Although video image display system 18 is illustrated in FIG. 2 as being positioned adjacent to video camera 12, display system 18 may be positioned at any desired location in a bowling center or remote from the bowling center, since communication with video tracking system 14 is achieved via electronic communication media 16. Illustrated in FIG. 2 are bowling balls 62 and 64 moving down bowling lanes 30 and 32, respectively. The image viewed by video camera 12 is the continuous image of bowling balls 62 and 64 as they travel down bowling lanes 30 and 32, respectively.

Figure 4:
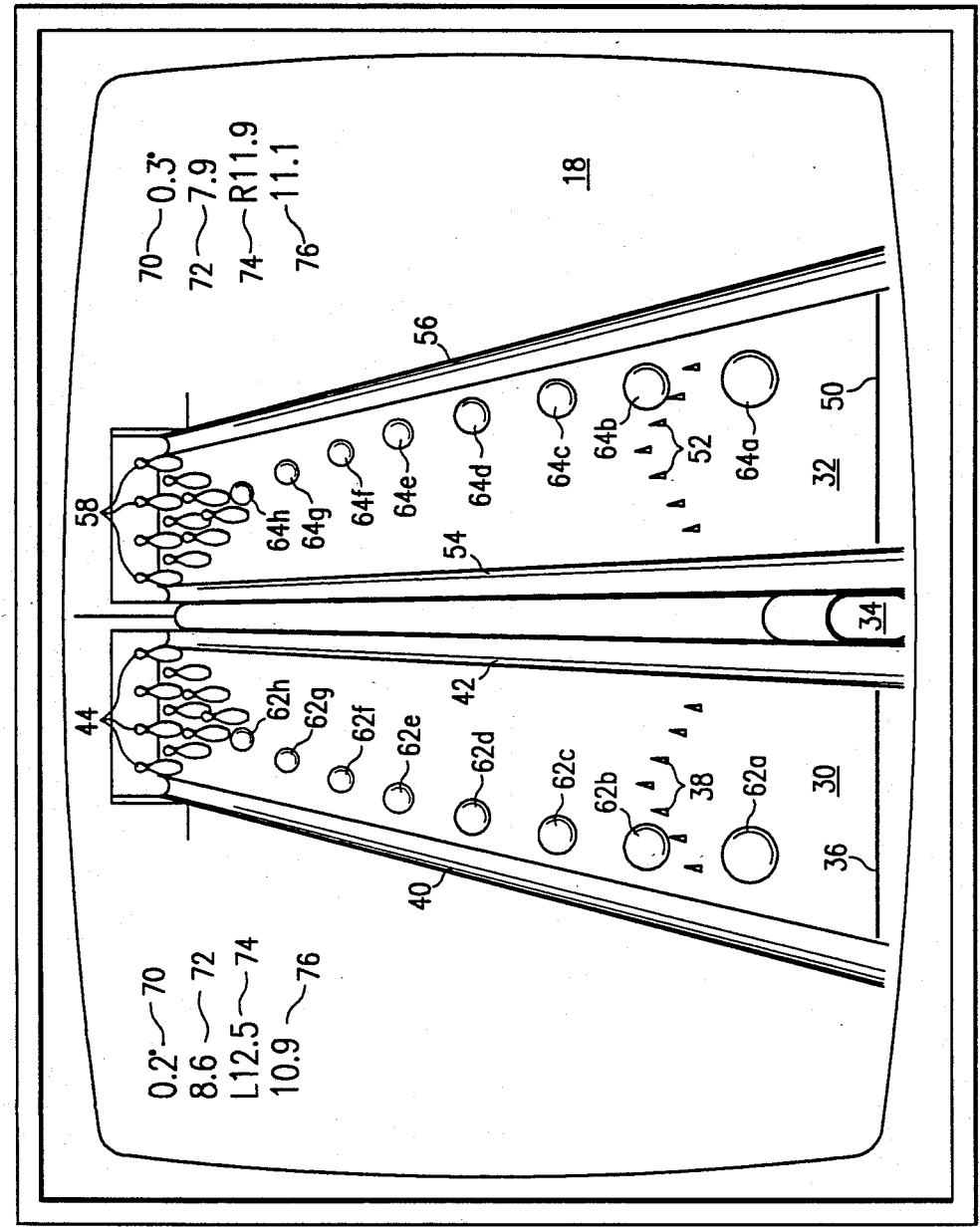
FIG. 4 is an illustration of the representation of the display associated with the present video tracking and display system for use with the tracking of a bowling ball.

FIG. 4 illustrates a display associated with video image display system 18 which would be displayed to a bowler during use of the present video tracking and display system 10. Video image display system 18 depicts a simulation of bowling lanes 30 and 32, and is not necessarily an image of the actual bowling lanes 30 and 32. The image of bowling lanes displayed on display system 18 is a previously stored digitized captured image of actual bowling lanes and may constitute an image of a bowling lane taken from a perspective different from that by video camera 12. The trajectory of bowling balls 62 and 64 is illustrated in video image display system 18 by representations of bowling balls at selected locations along the lane. The path of the bowling ball is therefore illustrated on video image display system 18 as a series of ball position representations along the trajectory of the bowling ball. For example, bowling ball 62 is illustrated by 8 representations 62a-62h along its path. This path corresponds to the continuous path of the bowling ball 62 as illustrated in FIG. 2 in the dotted lines. Similarly, bowling ball 64 is illustrated on video image display system 18 as having 8 positions 64a-64h. The present video tracking and display system 10 further displays to the bowler the angle of entry into the pin deck of bowling balls 62 and 64 at display location 70; the terminal velocity in miles per hour over predetermined positions, such as, for example, positions 62d and 62h of bowling ball 62 at display location 72; the position of the bowling balls 62 and 64 in terms of lane boards from the right hand or left hand of a bowling lane 30 or 32 at a predetermined distance such as, for example, 45 feet from the foul line at display location 74, and the initial velocity in miles per hour of the bowling balls 62 and 64 over predetermined positions such as between positions 62b and 62d of bowling ball 62 at display location 76.

In summary, the present video tracking and display system 10 includes a video tracking system which receives inputs in the form of video signals from video camera 12 representing the target image in addition to parameters describing the geometry of the system in its environment. The outputs of video tracking system 14 consists of data communicated via electronic communication medium 16 to video image display system 18. The output data consists of point locations describing the trajectory of a moving object or objects, average velocities between the point locations and direction of travel at or between various point locations.

An important aspect of the present invention is that data is gathered by video tracking system 14 in blocks, hereinafter referred to as "windows" or "frames". A window is a portion of the video image, taken along the trajectory of the object such as for example, bowling balls 62 and 64 along bowling lanes 30 and 32, respectively.

Figure 5:
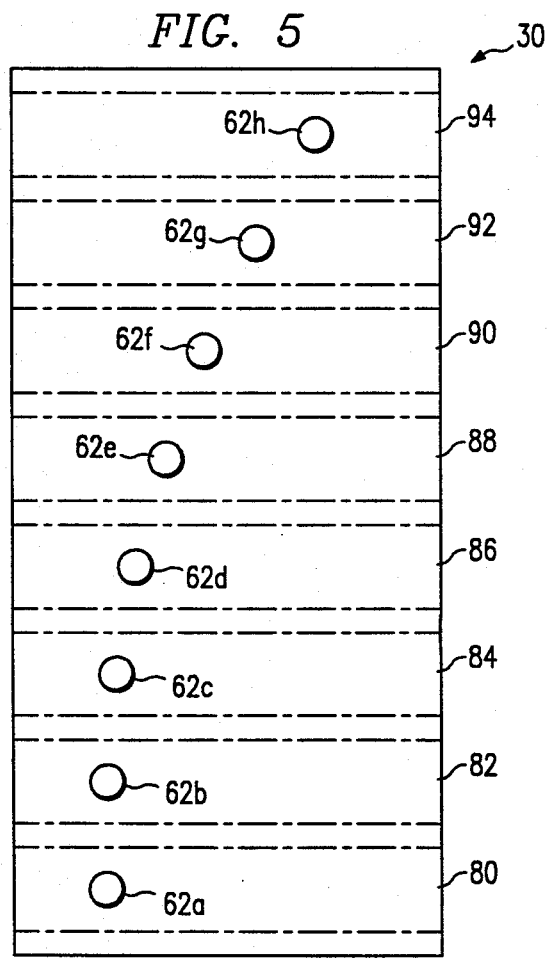
FIG. 5 illustrates in schematic form the tracking of a bowling ball through a plurality of frames.

FIG. 5 illustrates in schematic form, bowling lane 30 divided into 8 windows 80, 82, 84, 86, 88, 90, 92, and 94 along bowling lane 30. Captured within each window 80-94 is the position of bowling ball 62 as it progresses along its trajectory as illustrated in FIG. 2. The present video tracking system 14 detects the presence of bowling ball 62 within each window 80-94 and determines the coordinates of bowling ball 62 within each window 80-94. These coordinates are then utilized by the video image display system 18 to depict the positions of bowling ball 62 in the video image display system 18 as shown in FIG. 4. The windows are approximately three-fourths of a bowling ball size in height. Video tracking system 14 captures data on the vertical synchronization pulse of video camera 12 and then processes the captured data on the next video synchronization pulse to determine if a bowling ball is far enough into the window to be considered present within the window. Location occurs after all the windows have been captured by video tracking system 14. Video tracking system 14 then processes each window in detail to determine the ball position in each window 80-94. During processing, velocity and pin angle are calculated for display on video image display system 18. The centers of windows 80-94 at which the bowling balls illustrating the ball path will be displayed on video image display system 18 may be located at distances from the foul line at for example, 15 feet, 21 feet, 27 feet, 33 feet, 40 feet, 45.5 feet, 50 feet and 54 feet, respectively for the system utilizing eight windows.

Figure 6A:
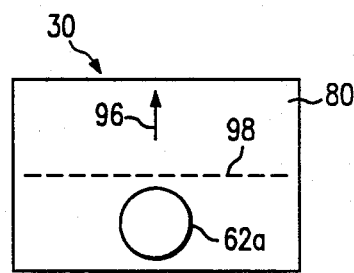
FIGS. 6A and 6B are schematic representations of the detection of a bowling ball within a frame.
Figure 6B:
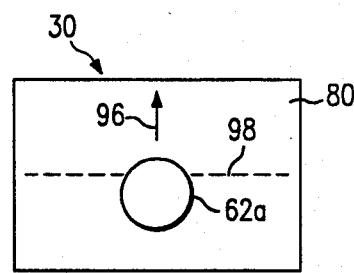
Figures 7A, 7B, 7C:
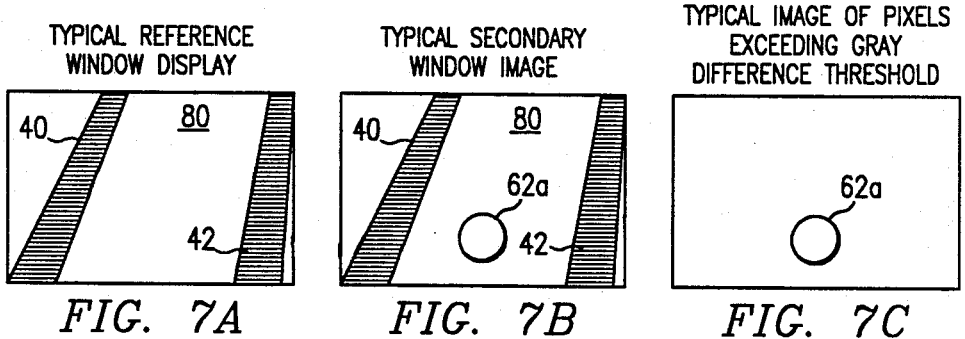
FIGS. 7A, 7B and 7C are schematic representations of gray scale processing performed by the present invention.
Figure 8:
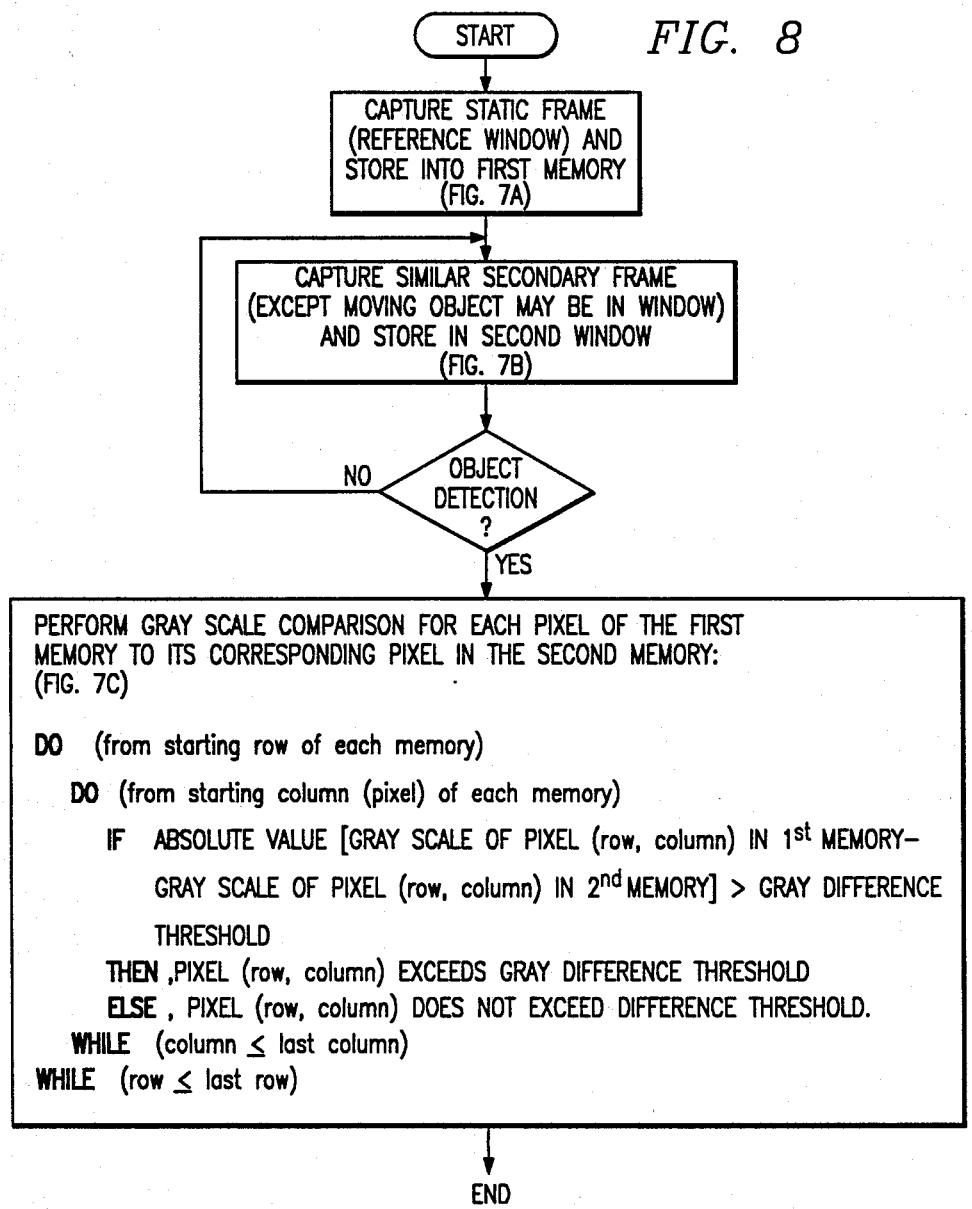
FIG. 8 is a flow diagram illustrating gray scale processing performed by the present invention.

As illustrated in FIGS. 6 and 7, when a bowling ball 62 moving in the direction of arrow 96 crosses the center 98 of a window 80, data is captured. A window is the smallest unit of information captured by video tracking system 14. Video tracking system 14 includes two memory subsystems as will subsequently be described with respect to FIG. 9. Within one memory, images of each window of the bowling lane 30 alone are stored. The second memory system contains data captured by video camera 12 of a bowling ball image moving through a window. These two memories for each window are then compared using gray scale processing as is well known to those skilled in the art, and, for example, using the gray scale comparison algorithm illustrated in FIG. 8 to determine the presence of a bowling ball (62, 64) within a window. Since the gray scale comparison is performed using the computer of FIG. 9, the image of the picture elements exceeding the gray difference threshold is shown in FIG. 7 for conceptual purposes only. As will be described subsequently, the video tracking system 14 generates tables to determine bowling ball location, thus preserving the data in the two memories and reducing memory requirements. Also the flexibility of the computer allows the window sizes and the gray scale thresholds used to be dynamically changed during processing.

The sequence of capturing data within each window 80-94 (FIG. 5) of bowling ball 62 will now be described. Initially, a reference frame of window 80 is captured and stored in the first memory. The reference frame for window 80 is captured at a time when no bowling ball is present within the field of window 80. Secondary frames are captured and recaptured and are stored in the second memory by overwriting this same second memory for each window 80-94 on a periodic basis until bowling ball 62 is detected within each frame 80-94. After detection, the last secondary frame captured is "frozen" in the video memory of the second memory subsystem. It is this last secondary frame which is then compared with the previously stored reference frame of the first memory subsystem in order to determine the presence of bowling ball 62 within each window 80-94. After detection of bowling ball 62 within window 80, window 82 then serves as the reference frame for bowling ball 62 passing through window 82. Window 82 is scanned by video camera 12 to serve as the reference frame simultaneously with the scanning of window 80 by video camera 12 to determine the presence of bowling ball 62 within window 80. Therefore, the reference frame through which the bowling ball 62 continuously moves down bowling lane 30 serves as a "fresh" reference frame in which the bowling ball 62 has not yet entered as it traverses its path through subsequent windows 84-94. During the time the video tracking system 14 is awaiting for bowling ball 62 to appear in window 80, window 80 is being scanned by video camera 12 in addition to window 82 which will serve as a subsequent reference frame.

After bowling ball 62 is detected within window 80, video tracking system 14 begins to store data within the second memory subsystem for window 82, and window 84 becomes a new reference window. When bowling ball 62 is detected within window 82, the number of frame counts between detection and the two windows 80 and 82 are saved for a time base to be utilized for velocity calculations of bowling ball 62 passing through windows 80 and 82 along bowling lane 30. This procedure continues until bowling ball 62 is detected within each window 80-94 such that a total of 8 reference frames and 8 secondary frames of data have been captured by video tracking system 14 and stored in the first and second memories, respectively, for use in determining the position of bowling ball 62 within each window 80-94 for display on video image display system 18. Since all the necessary data has been stored within the memory of video tracking system 14, all subsequent calculations and processing do not need to be performed in real time.

Detection of a bowling ball within a window is done by gray scale processing by comparing one line of video data and by differencing a picture element in the secondary frame memory with the corresponding picture element in the reference frame memory. If the absolute gray difference is greater than a gray difference threshold, the neighbor of the current picture element is compared. If the neighbor's gray difference is also greater than this threshold, and the difference has the same polarity, the picture element is counted as being different. In this manner, the effects of noise in determining the presence of a bowling ball within a window is minimized. The window is searched from the outside gutter edges, in overlapping zones. These zones are equal in size and overlapped by a ball diameter. If the total number of picture elements different is greater than the number of picture elements in one-third of a bowling ball diameter for the window being searched, in any of the five zones, a bowling ball has been detected on this scan line. By varying the constant, the systems' sensitivity can be varied.

In order to reach the conclusion that a bowling ball has been detected in a window, the video tracking system 14 must declare that the ball has been found on the detect line and the scan line immediately below the detect line, closer to the foul line. The detect line is located approximately one-fourth window size below the top of a window. Window 80, however, is treated differently from the other windows 82-94 in that the bowling ball must be detected on the detect line and a scan line located two scan lines below the detect line. If the ball is detected, the line with the greatest number of picture elements different is searched again utilizing the constant to which the reference is compared to in order to determine the contrast of the bowling ball. For a bowling ball having a low contrast with respect to the reflectivity of the bowling lanes 30 and 32, the constant is offset before processing data for windows 82-94. Because video tracking and display system 10 is capturing data for both bowling lanes 30 and 32 simultaneously, time multiplexing is accomplished to complete processing of the two bowling lanes 30 and 32 asynchronously.

Video tracking system 14 further determines the location of bowling ball 62 within each window 80-94 after all 8 windows have been stored in memory. Video tracking system 14 computes the scan line and picture element position of bowling ball 62 for each of the 8 windows. Processing is done through a window 80-94 line by line. Video tracking system 14 compares difference between the reference frame and the secondary frame looking for an absolute difference greater than the previously described gray difference threshold. The search begins at a specified left limit and the search progresses right for a ball segment. A ball segment is a number of picture elements in sequence that exceed the specified gray difference level. When a ball segment is located, the initial picture element in the sequence is declared to be the left edge of the ball. This search is repeated, beginning at the right search limit, searching left. When a ball segment is located, the initial picture element of this sequence is the right ball edge. This process is repeated for each line in the window in order to build a table of the left and right edges of the ball for each line.

This process continues in an iterative manner, providing noise filtering of the stored data. Using search limits of the width of bowling lane 30 plus a ball diameter on each side and the gray difference threshold set by external inputs to video tracking system 14 plus a positive offset, an initial pass through each window 80–94 is made. From the tables generated, the leftmost and rightmost edges of the bowling balls 62 and 64 are determined. A second pass through each window 80–94 is executed using search limits of the previously determined edges plus a large offset and a ball radius. Again, leftmost and rightmost ball edges are found using the preset gray difference threshold with no offset. A final iteration through the windows 80–94 are executed. The search limits used are leftmost and rightmost ball edges plus a small offset plus a ball radius. The gray difference reference level is the prior threshold plus a negative offset. This iteration allows a greater final accuracy for placement yet keeps the effects of noise to a minimum. On the final pass, the contrast of the ball is also calculated, determining whether the ball is dark or light colored. If the sum of the differences are negative, the ball is a reverse contrast, light colored ball. From the final edge tables generated, the tables are searched for the first line containing a ball segment. This line is the top of the ball, and this line along with the frame count is saved for later use for calculating the location and velocity of the ball.

To define the ball position along the width of the lane, either the left, right or center of the ball is used. This value is also derived from the edge tables stored within video tracking system 14. If the rightmost edge of the ball is located left of the left lane edge plus an offset, the rightmost edge is stored for processing, along with a flag noting right edge. If the leftmost edge of the ball is located right of the right lane edge plus an offset, the leftmost edge is stored for processing, along with a flag noting left edge. For the third case, the left and right edges are averaged, yielding the ball center. The center is stored and a flag is set noting the center of the ball. If the ball is a reverse contrast ball when the final position information is determined, the offset used in determining which edge of the ball to use is smaller and the left edge of the ball is compared to the left lane edge, since the contrast between a light ball and a dark gutter will be greater than the light lane surface. Similarly, if the ball is located on the right lane edge, the right edge of the ball is used.

This entire process is repeated for each of the 8 windows 80–94.

As previously stated, video image display system 18 displays velocity of bowling ball 62 over two groups of windows. The velocity is computed using the straight line distance between ball positions between windows and the travel time between those positions. The time interval is computed by summing the count of video frames between windows. Video frames occur at a rate of for example, 30 frames per second, this time interval is also corrected for the time difference due to the ball appearing on different video scan lines in the different windows. Ball entry angle into bowling pins 44 is then calculated based upon the ball position in windows 92 and 94. The ball position, velocity and angle information is then transmitted over electronic communication medium 16 to video image display system 18.

Figure 9:
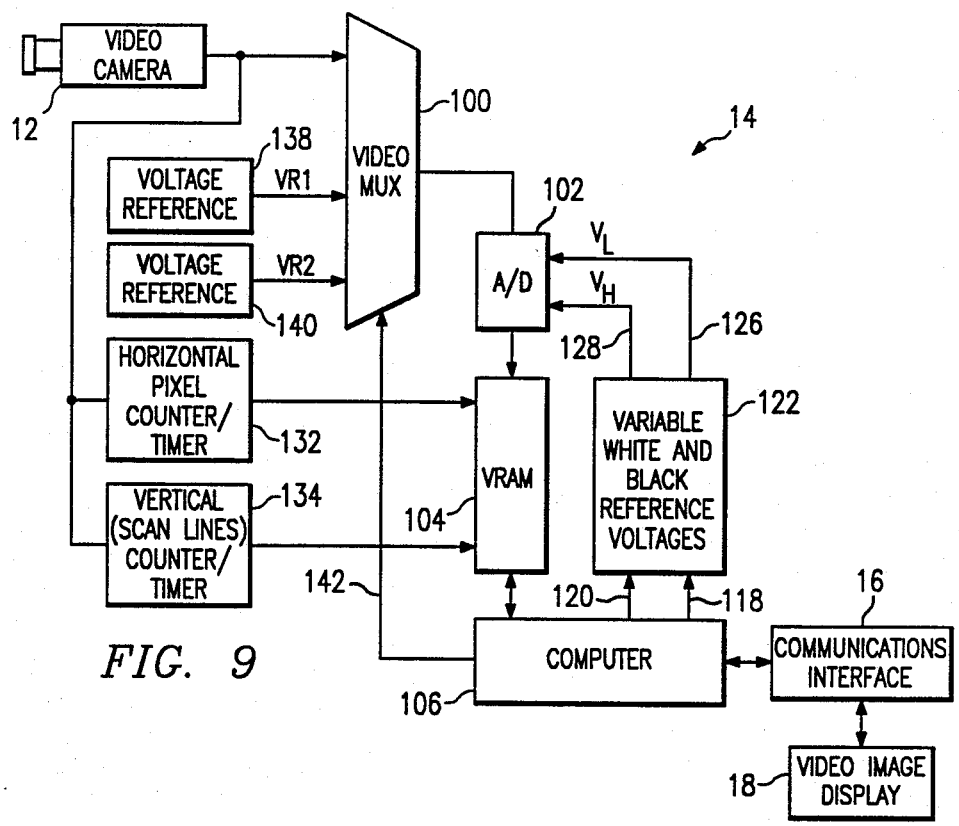
FIG. 9 is a block diagram of the present video tracking system illustrated in FIG. 1.

Referring now to FIG. 9, block diagram of the present video tracking system 14 is illustrated. Video camera 12 may comprise, for example, a standard RS-170 video camera which generates an analog video signal which is applied to a video multiplexer 100. The output of video camera 12 is a composite video signal including vertical and horizontal synchronization signals. The output of video multiplexer 100 is applied to an analog-to-digital converter 102 which generates digital data for storage in video random access memory (VRAM) 104. VRAM 104 includes the two memory subsystems previously described for storing reference frames and secondary frames of data captured by video camera 12 of bowling lanes 30 and 32. Data is stored in VRAM 104 in 256K bytes. VRAM 104 is a two-port memory which is accessed in parallel mode, but additionally supports serial accessing. The serial mode is used to write digitized video data into VRAM 104.

VRAM 104 is interconnected to a computer 106 which may comprise, for example, an Intel 8344 central processing unit. Computer 106 functions to perform a comparison between the reference frames and secondary frames to determine presence of a ball within a frame, ball location, velocity and pin angle. The output of computer 106 is applied to electronic communication medium 16 for application to video image display system 18. Outputs of computer 106 via signal lines 118 and 120 are applied to variable white and black reference voltages 122 which is utilized for setting the minimum ($V_L$) and maximum ($V_H$) output voltage levels for analog-to-digital converter 102, applied via signal lines 126 and 128, respectively.

VRAM 104 includes eight serial shift registers, each having 256 bits for storing one scan line of video data which represents the maximum width of one bowling lane. VRAM 104 includes a second bank of eight 256 bit shift registers for storing one scan line of video data for the second of bowling lanes 30 and 32. Computer 106 accesses VRAM 104 through the second, parallel, port of VRAM 104. VRAM 104 also has inputs from a horizontal picture element counter/timer 132 and a vertical counter/timer 134. These timing devices are utilized for transferring serial data from the shift registers into the parallel sections of the VRAM 104. Also input to video multiplexer 100 are dynamic voltage reference levels VR1, 138; and VR2, 140 for establishing the optimum black and white levels used during the analog to digital conversion of picture elements. Computer 106 controls the operation of multiplexer 100 via signal line 142.

The references voltages $V_L$ and $V_H$ utilized by analog-to-digital converter 102 in the conversion process are variable through the use of variable white and black references voltages 122. This variability allows video tracking system 14 to compensate for variations in the output of video camera 12 with age as well as allowing system 14 to calibrate itself to operate with different cameras 12. Reference voltages 122 may comprise a variable voltage source such as, for example, an Electronically Erasable potentiometer (EEpot) for each reference voltage $V_L$ and $V_H$ used by analog-to-digital converter 102.

Typically analog-to-digital converters transform analog signal to a digital signal using a linear transfer function. The conversion takes the form:

$$f(V) = K(V - V_L)/(V_H - V_L) \quad (1)$$

Which reduces to:

$$f(V) = mV + b \quad (2)$$

where:
f(V)=Transfer function
V=A/D Input Voltage
K=Number of possible outputs of A/D
$V_L$=Lower reference voltage
$V_H$=Upper reference voltage
m, b=constants Potentiometers within reference voltages 122 are used to set the reference voltages ($V_L$, $V_H$) so that the limits of the analog to digital conversion transfer function can be varied. By using a potentiometer directly adjustable by computer 106, system 14 can dynamically set the transfer function constants. The current limits of the reduced transfer function (Equation 2) can be determined by digitizing two known voltages using analog-to-digital converter 102, then calculating the transfer function. Computer 106 then digitizes an input voltage and sets the range of values for the resulting conversion accordingly.

The references, $V_L$ and $V_H$, are adjusted as follows. Multiplexer 100 routes the lower range limit of the upper reference voltage VR1, the upper range limit of the lower reference voltage VR2 and the input voltage from video camera 12 to analog-to-digital converter 102. Under the control of computer 106, multiplexer 100 selects VR1 which is then digitized and stored and then selects VR2 which is also digitized and stored. From these values, the current limits for analog-to-digital conversion are calculated. The known brightest part of the environment and the known darkest part of the environment are then digitized. The brightest and darkest parts define two known points, and in system 10, may comprise, for example the lane and the pit area, respectively. However, any two points are all that is necessary in this process, and not necessarily the whitest or darkest levels of the environment. The actual digital equivalent of these two points is then compared to the desired equivalent for these points. The new desired transfer function constants are then computed which is the desired slope (m) and intercept (b) of Equation 2. From these values the required adjustments to reference voltages $V_H$ and $V_L$ are computed and reference voltages $V_H$ and $V_L$ are adjusted accordingly.

It therefore can be seen that the present invention provides for a video tracking and display system in which the total trajectory of a moving object is divided into segments or windows. The position of the moving object within a window is detected and displayed on a video image display system. Since only portions of the total trajectory are stored, the memory storage requirements for the present system are minimized. Additionally, since data for each window is repeatedly stored within a same memory for each window until the object is detected within a window, memory requirements are also minimized. The present video tracking and display system further displays to the user object velocity, position, and direction.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. An image processing system for displaying a succession of selected separated images of a moving object moving in an otherwise substantially static scene, comprising:
   an image sensor for generating video signals of the static scene and for generating video signals of the static scene including the object moving therethrough, said video signals being generated over a plurality of frames;
   first memory means for storing video signals of at least one of said plurality of frames from the static scene;
   second memory means for storing video signals of said plurality of frames from the static scene including the object moving therethrough;
   means for comparing on a frame-by-frame basis said video signals stored in said first memory means with said video signals stored in said second memory means to thereby determine the presence of the object in each of said plurality of frames; and
   means for displaying the location of the object in each of said plurality of frames.

2. The image processing system of claim 1 wherein said display means further includes means for displaying a simulated image of the static scene including images of the object positioned thereon corresponding to the location of the object within each of said plurality of frames.

3. The image processing system of claim 1 wherein said display means further includes means for displaying the velocity of the object moving between selected frames of said plurality of frames.

4. The image processing system of claim 1 wherein said display means further includes means for displaying the location of the object with respect to a selected reference point within the static scene.

5. The image processing system of claim 1 wherein said comparing means includes means for establishing reference picture element threshold levels for determining the presence of the object in each of said plurality of frames.

6. The image processing system of claim 1 wherein said second memory means stores images of a single frame of said plurality of frames over a period of time until the presence of the object is detected.

7. The image processing system of claim 1 wherein said comparing means determines the presence of the object in each of said plurality of frames by detecting the leading edge of the object at a predetermined position within each of said plurality of frames.

8. The image processing system of claim 1 wherein said first memory means stores video images of all of said plurality of frames of the static scene.

9. The image processing system of claim 1 and further including:
   analog-to-digital converter means for converting video signals from analog to digital format;
   means interconnected to said converter means for generating reference voltages; and
   means for dynamically adjusting said reference voltages.

10. A bowling ball tracking and display device for displaying an image of a bowling ball at predetermined positions along a bowling lane, comprising:
   an image sensor for generating video signals of the bowling lane and for generating video signals of the bowling lane including the bowling ball moving therethrough, said video signals being generated over a plurality of frames;

first memory means for storing video signals of at least one of said plurality of frames from the bowling lane;

second memory means for storing video signals of said plurality of frames from the bowling lane including the bowling ball moving therethrough;

means for comparing on a frame-by-frame basis said video signals stored in said first memory means with said video signals stored in said second memory means to thereby determine the presence of the bowling ball in each of said plurality of frames; and means for displaying the location of the bowling ball in each of said plurality of frames.

11. The image processing system of claim 10 wherein said display means further includes means for displaying a simulated image of the bowling lane including images of the bowling ball positioned thereon corresponding to the location of the bowling ball within each of said plurality of frames.

12. The image processing system of claim 10 wherein said display means further includes means for displaying the velocity of the bowling ball moving between selected frames of said plurality of frames.

13. The image processing system of claim 10 wherein said display means further includes means for displaying the location of the bowling ball with respect to a selected reference point along the bowling lane.

14. The image processing system of claim 10 wherein said comparing means includes means for establishing a reference picture element threshold levels for determining the presence of the bowling ball in each of said plurality of frames.

15. The image processing system of claim 10 wherein said second memory means stores images of a single frame of said plurality of frames over a period of time until the presence of the bowling ball is detected.

16. The image processing system of claim 10 wherein said comparing means determines the presence of the bowling ball in each of said plurality of frames by detecting the leading edge of the bowling ball at a predetermined position within each of said plurality of frames.

17. The image processing system of claim 10 wherein said first memory means stores video images of all of said plurality of frames of the bowling lane.

18. A bowling ball tracking and display device for capturing an image of the motion of a bowling ball moving over a bowling lane and for displaying an image of the bowling ball at predetermined positions, comprising:

an image sensor for generating video signals for the bowling lane and for generating video signals of the bowling lane with the bowling ball moving therethrough, said video signals being generated over a plurality of frames;

memory means for storing said video signals of said plurality of frames;

means for comparing on a frame-by-frame basis said video signals stored in said memory means to thereby determine the presence of the bowling ball in each of said plurality of frames; and means for displaying the location of the bowling ball in each of said plurality of frames on a stored image of a bowling lane.

19. The device of claim 18 wherein said stored image comprises a color representation of an actual bowling lane.

20. The device of claim 18 wherein said image sensor and display means further includes:

means for simultaneously displaying images of the motion of multiple bowling balls along multiple bowling lanes.

21. An image processing system for capturing an image of an object, comprising:

an image sensor for generating analog video signals of the object;

analog-to-digital converter means for converting said analog video signals to digital signals;

means interconnected to said converter means for generating reference voltages; and means for dynamically adjusting said reference voltages to set, at the beginning for an entire period of use of said image processing system, optimum black and white levels used during the analog-to-digital conversion of said analog video signals, whereby said analog-to-digital converter converts said generated analog video signals into digital data, and modifies said data, if required, so that it is within said optimum white and black levels.

22. A method for dynamically adjusting an analog-to-digital converter to compensate for changes in the signal levels of an image sensor comprising the steps of:

generating analog video signals from the image sensor;

converting the analog signals to digital signals;

generating reference voltages;

applying the reference voltages to the analog-to-digital converter; and dynamically adjusting the reference voltages to set, at the beginning for an entire period of use of said image processing system, optimum black and white levels used during the analog-to-digital conversion of said analog video signals, whereby said analog-to-digital converter converts the generated analog video signals into digital data, and modifies said data, if required, so that it is within said optimum white and black levels.

23. A method for displaying the trajectory of an object moving through an otherwise substantially static scene, comprising the steps of:

capturing the image of the static scene over a plurality of frames;

capturing the image of the static scene including the moving object over a plurality of frames corresponding to the plurality of frames of the static scene;

storing an image of a reference frame of the plurality of frames of the static scene;

storing an image of the object moving through each of the plurality of frames;

comparing the image of the object moving through each of the plurality of frames with the corresponding image of the reference frame;

detecting the presence of the object in each of the plurality of frames;

determining the location of the object within each of the plurality of frames based upon the comparison of the object moving through each of the plurality of frames and the corresponding image of the reference frame; and displaying the location of the object within each of the plurality of frames on a representation of the static scene.

24. The method of claim 23 wherein the step of storing the image of the reference frame includes:
  storing the image of each of the plurality of frames of the static scene, such that the reference frame shifts from the first of the plurality of frames to the last of the plurality of frames of the static scene as the object moves through the plurality of frames, to thereby compare each frame containing the object to each frame without the object.

25. The method of claim 24 wherein the step of storing the image of the moving object through one of the plurality of frames occurs simultaneously with the storing of the image of the next subsequent reference frame.

26. The method of claim 23 wherein the static scene includes a bowling lane, the moving object includes a bowling ball, and the display displays a representation of the trajectory of the bowling ball at selected locations along the bowling lane.

* * * * *